No. 765,344. PATENTED JULY 19, 1904.
T. G. LEWIS.
BENCH BLOCK.
APPLICATION FILED FEB. 25, 1904.
NO MODEL. 2 SHEETS—SHEET 1.
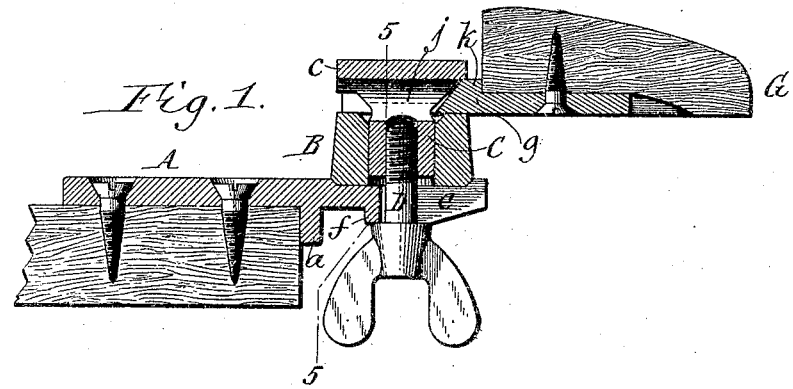
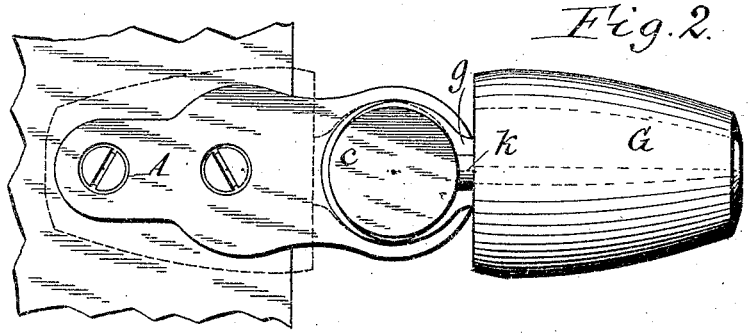
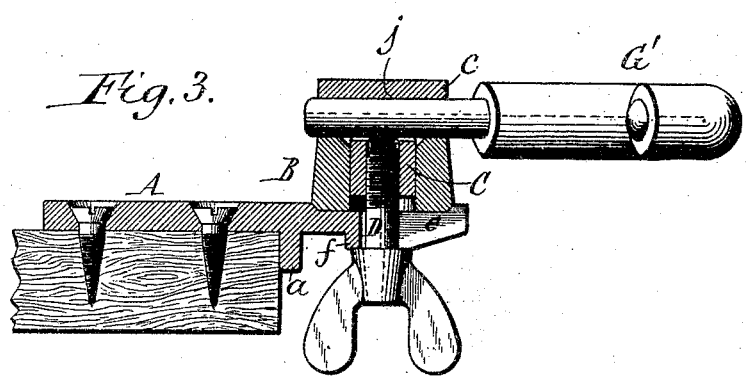
Witnesses:
Robert Weitknecht.
Louis W. Grah.
Theodore G. Lewis
Inventor
By Geyer & Popp
Attorneys.

No. 765,344. PATENTED JULY 19, 1904.
T. G. LEWIS.
BENCH BLOCK.
APPLICATION FILED FEB. 25, 1904.
NO MODEL. 2 SHEETS—SHEET 2.

Witnesses:
Robert Weitknecht
Louis W. Gratz

Theodore G. Lewis, Inventor
By Geyer & Papp
Attorneys.

No. 765,344. Patented July 19, 1904.

UNITED STATES PATENT OFFICE.

THEODORE G. LEWIS, OF BUFFALO, NEW YORK, ASSIGNOR TO BUFFALO DENTAL MANUFACTURING COMPANY, OF BUFFALO, NEW YORK.

BENCH-BLOCK.

SPECIFICATION forming part of Letters Patent No. 765,344, dated July 19, 1904.

Application filed February 25, 1904. Serial No. 195,147. (No model.)

*To all whom it may concern:*

Be it known that I, THEODORE G. LEWIS, a citizen of the United States, residing at Buffalo, in the county of Erie and State of New York, have invented new and useful Improvements in Bench-Blocks, of which the following is a specification.

This invention relates to a bench-block designed more especially for the use of metalworkers, dentists, and jewelers.

The object of my invention is the provision of an inexpensive device of this character which can be adjusted to different positions to suit the requirements of the workman and which, if desired, can be readily turned out of the way or removed from the bench.

Figure 5:
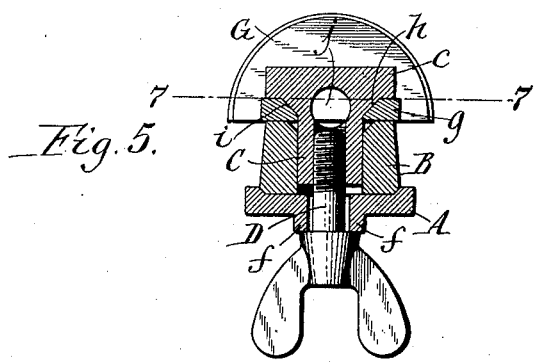
Figure 6:
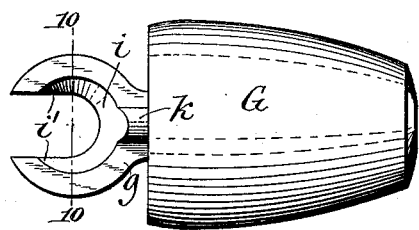
Figure 7:
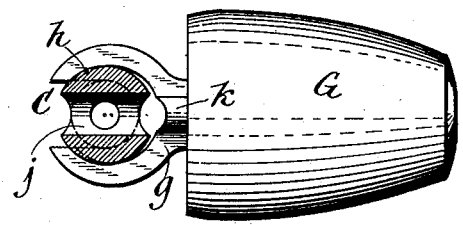
Figure 8:
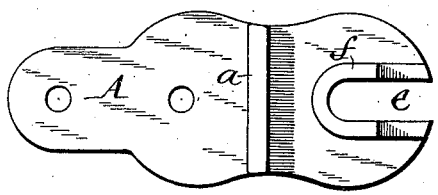
Figure 9:
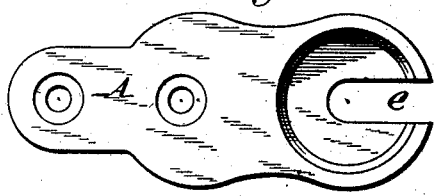
Figure 10:
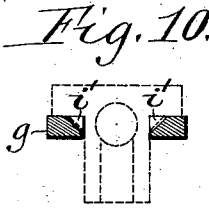

In the accompanying drawings, consisting of two sheets, Figure 1 is a sectional elevation of the bench-block. Fig. 2 is a top plan view thereof. Fig. 3 is a view similar to Fig. 1, showing a work-rest for dental plates clamped in the device. Fig. 4 is a detached top plan view of the last-mentioned work-rest. Fig. 5 is a transverse vertical section in line 5 5, Fig. 1. Fig. 6 is a detached top plan view of the block or rest shown in Figs. 1, 2, and 5. Fig. 7 is a similar view of the rest, in connection with its supporting-post, said post being shown in transverse section on the line 7 7, Fig. 5. Figs. 8 and 9 are detached bottom and top plan views, respectively, of the base or bracket. Fig. 10 is a cross-section of the shank of the work-rest in line 10 10, Fig. 6, showing the relation of its shoulders to the fillet of the post, which latter is indicated by dotted lines.

Similar letters of reference indicate corresponding parts throughout the several views.

A indicates the base or bracket of the bench-block, secured to a bench or other support by screws or other suitable fastenings and provided on its under side with a transverse rib or flange $a$, adapted to bear against the front edge of the bench.

B is a collar or standard seated in a socket or recess in the upper side of the bracket A, so as to be held against displacement thereon, and C is a stud or post loosely fitted in said collar and having a head or flange $c$. This post is provided with a suitable clamping device which tends to draw its head $c$ toward the collar B. The means preferred for this purpose consist of a thumb-screw or bolt D, passing upwardly through a slot or opening $e$ in the bracket A and engaging in a screw-threaded opening formed axially in the post, as shown in the drawings. The head of the thumb-screw may abut directly against the flat under side of the bracket, but it preferably bears against a raised rim or flange $f$ bounding the edge of the slot $e$ to permit of a more convenient manipulation of the screw. This slot extends to the edge of the bracket, so that the thumb-screw, with the collar B and the post C, can be readily applied to and removed from the bracket. To facilitate the insertion of the screw in the slot the outer parallel portions of the flange $f$ are inclined or beveled on their under side, as shown in Figs. 1 and 3.

The work-rest or block proper may be of any suitable form and is provided with a shank, which is clamped between the collar B and the head of the post C. In the construction shown in Figs. 1, 2, 5, 6, and 7 the rest consists of a wooden block G, tapered toward its front end and having a convex upper surface, this rest being especially desirable for gold and similar work. The block is provided with a slotted or bifurcated shank $g$, which straddles the neck of the post C and is clamped between the head of the latter and the upper side of the collar B by the thumb-screw D, the top of the collar and the under side of the head being preferably flat, as shown, to form extensive bearing-surfaces for the shank of the work-rest. Upon loosening this thumb-screw the block can be adjusted horizontally to any desired position or when not in use may be turned out of the way, as shown by dotted lines in Fig. 2. In order to prevent the block from being detached from the post in adjusting it or turning it out of the way, the post is provided adjacent to its head $c$ with a fillet or enlargement $h$ of larger diameter than the width of the slot in the shank $g$, and the edge of this slot is recessed or beveled to form a seat $i$ of the proper form to snugly receive said fillet. This recess terminates short of the outer end of the slot, as shown in Figs. 6 and 10, leaving shoulders or stops $i'$, which retain the shank upon the post so long as the fillet remains seated in the recess $i$, thus preventing the block from becoming detached from the bolt and dropping on the floor even when the thumb-screw D is loosened sufficiently to permit rotation of the block. When, however, the thumb-screw is loosened to such an extent as to allow the fillet $h$ to rise fully out of its seat and clear the shoulders $i'$, the block can be removed without restraint.

If desired, the block G may be replaced by a work-rest of different form. For example, the hook-shaped rest $G'$ (shown in Figs. 3 and 4) may be used interchangeably with the same, this rest being suitable for supporting dental plates in filing and scraping them and being preferably covered with rubber. The shank of this rest passes through a transverse opening $j$ of the post C and is clamped between the head of the post and the collar B. This hook-rest is adjustable in a horizontal plane, like the first-described rest G, and can also be tilted to any desired position. The shank of the block G is preferably provided with a lug $k$, adapted to interlock with the transverse opening $j$ of the post, for preventing the rest from turning independently of the post.

If desired, the entire device with the exception of the base or bracket A may be removed from the bench by loosening the thumb-screw D and withdrawing the same from the slot of the bracket.

I claim as my invention—

1. In a bench-block, the combination with a bracket having a slot which extends to its edge, of a collar resting on the bracket, a headed post seated in said collar, a work-rest having a shank arranged between the head of the post and said collar, and a clamping device passing through said slot and engaging with said post, substantially as set forth.

2. In a bench-block, the combination with a bracket having a slot which extends to its edge, the bracket being provided on its under side along the edge of said slot with a beveled rim, of a collar resting on the bracket, a headed post seated in said collar, a work-rest having a shank arranged between the head of the post and said collar, and a clamping-bolt passing upwardly through said slot, bearing with its head against said rim and engaging with said post, substantially as set forth.

3. In a bench-block, the combination with a bracket having a socket and a slot extending to the edge of the bracket, of a collar seated in said socket, a headed post fitted in said collar, a work-rest having a shank arranged between said collar and the head of said post, and a clamping-bolt passing through said slot and engaging with said post, substantially as set forth.

4. In a bench-block, the combination of a bracket, a headed post supported thereon and provided adjacent to its head with a fillet or enlargement, a work-rest having a shank provided with a slot which receives said post, said slot being open at one end and provided in its edge with a seat for said fillet, and means for clamping the post and said shank in position, substantially as set forth.

5. In a bench-block, the combination of a bracket, a collar mounted thereon, a headed post fitted in said collar and provided adjacent to its head with a fillet or enlargement, a work-rest having a shank provided with a slot which receives said post, said slot being provided in its edge with a recess which receives said fillet and terminates short of the open end of the slot, forming stop-shoulders, and a clamping-bolt passing through said bracket and engaging with said post, substantially as set forth.

6. In a bench-block, the combination of a bracket, a collar mounted thereon, a headed post fitted in said collar and provided with an opening, a work-rest having a shank arranged between the head of said post and said collar and provided with a lug which interlocks with the opening of the post, and means for clamping the shank between said head and said collar, substantially as set forth.

Witness my hand this 12th day of February, 1904.

THEODORE G. LEWIS.

Witnesses:
CARL F. GEYER,
EMMA M. GRAHAM.